(12) United States Patent
Sugiura et al.

(10) Patent No.: US 8,709,662 B2
(45) Date of Patent: Apr. 29, 2014

(54) METHOD FOR PRODUCING CATHODE ACTIVE MATERIAL FOR A LITHIUM SECONDARY BATTERY

(75) Inventors: Ryuta Sugiura, Nagoya (JP); Tsutomu Nanataki, Toyake (JP); Jun Yoshikawa, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 147 days.

(21) Appl. No.: 13/112,029

(22) Filed: May 20, 2011

(65) Prior Publication Data

US 2011/0309291 A1    Dec. 22, 2011

Related U.S. Application Data

(60) Provisional application No. 61/356,188, filed on Jun. 18, 2010.

(51) Int. Cl.
   *H01M 4/13* (2010.01)
   *H01M 8/06* (2006.01)
   *H01L 35/34* (2006.01)
   *H01M 4/88* (2006.01)

(52) U.S. Cl.
   USPC .... 429/231.95; 429/408; 136/201; 252/182.1

(58) Field of Classification Search
   USPC ........ 136/1, 201; 252/182.1; 429/231.95, 408
   See application file for complete search history.

(56) References Cited

U.S. PATENT DOCUMENTS

| 2004/0179993 | A1 | 9/2004 | Dahn et al. |
| 2009/0230349 | A1 | 9/2009 | Dahn et al. |

FOREIGN PATENT DOCUMENTS

| JP | 09-022693 | A1 | | 1/1997 |
| JP | 2002-234796 | | * | 8/2002 |
| JP | 2002-234796 | A1 | | 8/2002 |
| JP | 2003-132887 | A1 | | 5/2003 |
| JP | 2003-346809 | A1 | | 12/2003 |
| JP | 2005-116321 | | * | 4/2005 |
| JP | 2005-116321 | A1 | | 4/2005 |
| JP | 2006-520525 | A1 | | 9/2006 |
| WO | 2004/084330 | A2 | | 9/2004 |

\* cited by examiner

*Primary Examiner* — Monique Peets
(74) *Attorney, Agent, or Firm* — Burr & Brown, PLLC (57) ABSTRACT

The method for producing a cathode active material for a lithium secondary battery is characterized by including (1) a forming step of forming a sheet-form compact containing, as raw substances, a lithium compound serving as a first ingredient, a compound of a transition metal other than lithium serving as a second ingredient, and at least one of boron oxide and vanadium oxide serving as a third ingredient; and (2) a firing step of firing the compact at 700 to 1,300° C.

5 Claims, 6 Drawing Sheets

METHOD FOR PRODUCING CATHODE ACTIVE MATERIAL FOR A LITHIUM SECONDARY BATTERY

BACKGROUND OF THE INVENTION

1. Field of the Invention

The present invention relates to a method for producing a cathode active material having a layered rock salt structure for a lithium secondary battery.

2. Description of the Related Art

Cobalt-based cathode active materials are widely used as materials for producing a cathode of a lithium secondary battery (may be referred to as a lithium ion secondary battery). Such cobalt-based cathode active materials (typically, $LiCoO_2$) have a so-called $\alpha$-$NaFeO_2$ type layered rock salt structure. In the cobalt-based cathode active materials, intercalation and deintercalation of lithium ions ($Li^+$) occur through crystal planes other than the (003) plane (i.e., lithium ion intercalation/deintercalation planes, e.g., the (101) plane and the (104) plane). Through such intercalation and deintercalation of lithium ions, charge and discharge are carried out.

As used herein, the term "layered rock salt structure" refers to a crystal structure in which lithium layers and layers of a transition metal other than lithium are arranged in alternating layers with an oxygen layer therebetween; i.e., a crystal structure in which transition metal ion layers and lithium layers are arranged in alternating layers via oxygen ions (typically, $\alpha$-$NaFeO_2$ type structure: cubic rock salt type structure in which transition metal and lithium layers are arrayed orderly in the direction of the [111] axis).

SUMMARY OF THE INVENTION

Such cathode active material brings about improvement in cell capacity through exposure of as many lithium ion intercalation/deintercalation planes as possible to electrolyte. There are demands not only for merely improving capacity, but also for improving as many characteristics as possible, such as durability. The present invention has been conceived to solve such a problem. That is, an object of the present invention is to provide a method for producing a cathode active material, which enables consistent production of a cathode active material that can improve characteristics (e.g., capacity and durability) of a lithium secondary battery compared with conventional cathode active materials.

A characteristic feature of the method of the present invention for producing a cathode active material for a lithium secondary battery resides in that the method includes the following steps:

a forming step of forming a sheet-like compact (green sheet) containing, as raw substances, a lithium compound serving as a first ingredient, a compound of a transition metal other than lithium serving as a second ingredient, and at least one of boron oxide ($B_2O_3$) and vanadium oxide ($V_2O_5$) serving as a third ingredient; and a firing step of firing the green sheet at 700 to 1,300° C.

The aforementioned compact preferably has a third ingredient content of 0.4 to 25 wt. %. More preferably, the third ingredient contains both boron oxide and vanadium oxide. In this case, the ratio by mole of boron oxide to vanadium oxide ("amount by mole of boron oxide/amount by mole of vanadium oxide") preferably falls within a range of 1 to 10.

The aforementioned production method may further include the following step:

a crushing step of crushing the fired product sheet (cathode active material film) which has been produced in the aforementioned firing step into a large number of plate-like particles (cathode active material particles).

The production method of the present invention enables consistent production of plate-like particles of a lithium secondary battery cathode active material in which the (003) plane in the layered rock salt structure is oriented so as to intersect the plate surface of the particles (the definition of the plate surface will be described later). The particles are formed such that planes other than the (003) plane (i.e., lithium ion intercalation/deintercalation planes, e.g., the (104) plane) are oriented in parallel with the plate surface. The particles can be formed to a thickness of 100 µm or less (e.g., 20 µm or less).

"The (104) plane is oriented in parallel with the plate surface" may be rephrased as follows: the (104) plane is oriented such that the [104] axis, which is normal to the (104) plane, is in parallel with the direction of the normal of the plate surface.

That is, in the plate-like particle for a lithium secondary battery cathode active material produced through the production method of the present invention, the [003] axis in the layered rock salt structure intersects the normal of the plate surface of the particle. In addition, the particle is formed such that crystal axes (e.g., the [104] axis) which intersect the [003] axis are in a direction orthogonal to the plate surface.

The term "plate-like particle" refers to a particle whose external shape is plate-like. The concept of "plate-like" is apparent under social convention without need of particular description thereof in the present specification. However, if the description were to be added, "plate-like" would be defined, for example, as follows.

Namely, "plate-like" refers to a state in which, when a particle which is placed on a horizontal surface (a surface orthogonal to the vertical direction, along which gravity acts) stably (in a manner as not to further fall down even upon subjection to an external impact (excluding such a strong impact as to cause the particle to fly away from the horizontal surface)) is cut by a first plane and a second plane which are orthogonal to the horizontal surface (the first plane and the second plane intersect each other, typically at right angles), and the sections of the particle in the two planes are observed, a dimension of the sections along the width direction (the dimension is referred to as the "width" of the particle), which is along the horizontal surface (in parallel with the horizontal surface or at an angle of a degrees (0<α<45) with respect to the horizontal surface), is greater than a dimension of the sections along the thickness direction (the dimension is referred to as the "thickness" of the particle), which is orthogonal to the width direction. Note that the term "thickness" does not include the space between the horizontal surface and the particle.

The plate-like particle produced through the production method of the present invention is generally formed in a flat plate-like form. As used herein, the term "flat plate-like form" refers to a state in which, when a particle is placed stably on a horizontal surface, the height of a gap formed between the horizontal surface and the particle is less than the thickness of the particle. Since a plate-like particle of this kind is not generally curved to an extent greater than the state, the definition mentioned above is appropriate for the plate-like particle produced through the production method of the present invention.

In a state in which a particle is placed stably on a horizontal surface, the thickness direction is not necessarily parallel to the vertical direction. This is discussed below under the assumption that the sectional shape of particle placed stably on a horizontal surface, as cut by the first plane or the second plane, is most close to, one of (a) rectangular, (b) diamond, and (c) elliptic shapes. When the sectional shape of the particle is close to (a) rectangular shape, the width direction is parallel to the horizontal surface in the state mentioned above, and the thickness direction is parallel with the vertical direction in the state mentioned above.

When the sectional shape of the particle is a (b) diamond shape or (c) elliptic shape, the width direction may form some angle (45 degrees or less; typically, about a few degrees to about 20 degrees) with respect to the horizontal surface. In this case, the width direction is a direction along the line which connects the two most distant points on the outline of the section (this definition is not appropriate for the case of (a) rectangular shape, since the width direction is along a diagonal of the rectangular shape).

The term "plate surface" of a particle refers to a surface which faces the horizontal surface in a state in which the particle is placed stably on a horizontal surface, or a surface which faces an imaginary plane located above the particle as viewed from the horizontal surface and being parallel with the horizontal surface. Since the "plate surface" of a particle is the widest surface on the plate-like particle, the "plate surface" may be referred to as the "principal surface." A surface which intersects (typically, at right angles) the plate surface (principal surface); i.e., a surface which intersects the plate surface direction (or in-plane direction), which is perpendicular to the thickness direction, is referred to as an "end surface," since the surface locates at an edge when the particle in a state of being stably placed on the horizontal surface is viewed in plane (when the particle in a state of being stably placed on the horizontal surface is viewed from a position above the particle with respect to the vertical direction).

Nevertheless, in many cases, the plate-like particle produced through the production method of the present invention is formed such that the sectional shape of the particle is close to (a) rectangular shape. Thus, in the plate-like particle, the thickness direction may be considered to be parallel to the vertical direction in a state in which the particle is placed stably on a horizontal surface. Similarly, in the plate-like particle, the "plate surface" of the particle may be considered to be a surface orthogonal to the thickness direction of the particle.

According to the production method of the present invention, a cathode active material film for a lithium secondary battery in which the (003) plane in the layered rock salt structure is oriented in a direction which intersects the plate surface of the film (the definition of the plate surface of the film will be described later) can be reliably produced. In this case, the cathode of the lithium secondary battery may be formed by stacking the cathode active material film on a predetermined cathode collector. The film may be formed to a thickness of 100 μm or less (e.g., 20 μm or less).

That is, in the cathode active material film for a lithium secondary battery produced through the production method of the present invention, the [003] axis in the layered rock salt structure is oriented in a direction which intersects the normal of the plate surface of the film. In addition, the film is formed such that axes which intersect the [003] axis (e.g., the axis) are oriented in a direction orthogonal to the plate surface.

The term "thickness direction" of a film refers to a direction parallel to the vertical direction in a state in which the film is placed stably on a horizontal surface (a dimension of the film along the direction is referred to as "thickness"). The "plate surface" of a film refers to a surface orthogonal to the thickness direction of the film. Since the "plate surface" of the film is the widest surface on the film, the "plate surface" may be referred to as the "principal surface." A surface which intersects (typically, at right angles) the plate surface (principal surface); i.e., a surface which intersects the plate surface direction (or in-plane direction), which is perpendicular to the thickness direction, is referred to as an "end surface," since the surface locates at an edge when the film in a state of being stably placed on the horizontal surface is viewed in plane (when the film in a state of being stably placed on the horizontal surface is viewed from a position above the particle with respect to the vertical direction). The "thickness" mentioned above does not include a gap between the horizontal surface and the particle.

The aforementioned cathode active material film is generally formed flat. The term "flat" refers to a state in which, when a film is placed stably on a horizontal surface, the height of a gap formed between the horizontal surface and the film is less than the thickness of the film. Since a cathode active material film of this kind is not generally curved significantly, the definition mentioned above is appropriate for the cathode active material film.

As described above, in formation of the cathode, the "plate-like particles for a cathode active material" may be dispersed in the cathode active material layer. Meanwhile, the "cathode active material film" is a self-standing film (a film which can be handled by itself after formation) which can form the cathode through lamination to the cathode collector. As in the case of examples to be described later, the film may be crushed into fine particles (the resultant particles correspond to the "plate-like particles for a cathode active material" of the present invention), followed by dispersion in the cathode active material layer. In this way, the distinction between "particles" and "film" is apparent to those skilled in the art in association with the mode of application to formation of the cathode.

Regarding the degree of orientation, the ratio of intensity of diffraction by the (003) plane to intensity of diffraction by the (104) plane, [003]/[104], as obtained through X-ray diffraction preferably falls within a range of 0.005 to 1.0.

When the peak intensity ratio [003]/[104] is 1.0 or less, the deintercalation of lithium ions is facilitated, resulting in a remarked improvement in charge-discharge characteristics. However, when the ratio [003]/[104] is less than 0.005, the cycle characteristic deteriorates. Conceivably, this is because, when the degree of orientation is excessively high (i.e., crystals are oriented to an excessively high degree), a change in volume of crystal associated with intercalation and deintercalation of lithium ions causes the particles and the film to be readily broken (the detailed deterioration mechanism of the cycle characteristics has not been elucidated).

The precise mechanism of formation of the aforementioned cathode active material film and particles through the production method of the present invention is under extensive investigation. However, currently, one conceivable mechanism is as follows.

Since the third ingredient has a melting point lower than the firing temperature employed in the firing step ($B_2O_3$: 480° C./$V_2O_5$: 690° C.), the third ingredient is melted when the aforementioned compact is heated in the firing step. The liquid phase of the third ingredient preferentially reacted with the (104) plane of $LiMO_2$ when the lithium compound serving as the first ingredient reacts with the transition metal compound serving as the second ingredient to thereby form $LiMO_2$ (M represents a transition metal; e.g., Co, Ni, or ($Ni_{0.5}Mn_{0.5}$)). As a result, the surface energy of the (104) plane decreases, whereby the (104) plane is exposed to the plate surface of the fired product sheet (cathode active material film), to thereby promote crystal growth.

Particularly when $B_2O_3$ and $V_2O_5$ are added in a total amount of 0.4 to 25 wt. % and at a ratio by more of boron oxide to vanadium oxide of 1 to 10, crystal orientation can be further enhanced. Although the mechanism of the enhancement is also under extensive investigation, one mechanism which is conceivable at present is lowering the melting temperature of the $B_2O_3$—$V_2O_5$ mixture through the eutectic phenomenon and subsequent promotion in reaction with the (104) plane of $LiMO_2$.

Notably, the low-melting third ingredient volatiles and a trace amount of the third ingredient remains in the fired product. Therefore, cell characteristics are not impaired. In the case where no third ingredient is added, the (003) plane, which intrinsically has low surface energy, is exposed to the plate surface during crystal growth, resulting in drops in capacity and rate characteristics.

DETAILED DESCRIPTION OF THE INVENTION

Embodiments of the present invention will next be described with reference to the drawings. Modifications that can be made to the embodiments and examples are collectively described herein principally at the end, since insertion thereof into the description of the embodiments would disturb consistent understanding of description of the embodiments.

<Configuration of Lithium Secondary Battery 1: Liquid Type>

Figure 1A:
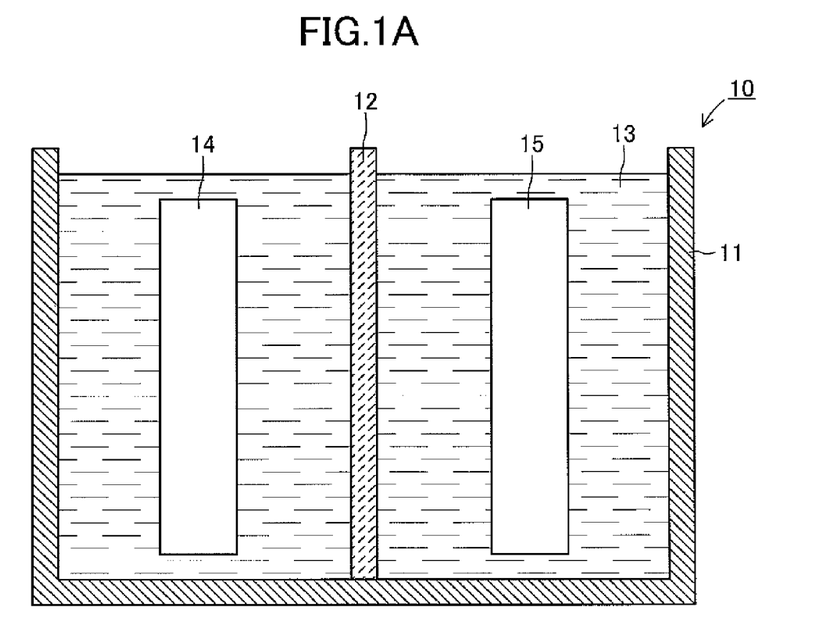
FIG. 1A is a sectional view of the schematic configuration of a lithium secondary battery according to an embodiment of the present invention.

In FIG. 1A, a lithium secondary battery 10 is of a so-called liquid type and has a cell casing 11, a separator 12, an electrolyte 13, an anode 14, and a cathode 15.

The separator 12 is provided so as to halve the interior of the cell casing 11. The cell casing 11 accommodates the liquid electrolyte 13. The anode 14 and the cathode 15 are provided within the cell casing 11 in such a manner as to face each other with the separator 12 located therebetween.

The electrolyte 13 is preferably a nonaqueous-solvent-based electrolytic solution prepared by dissolving an electrolyte salt, such as a lithium salt, in a nonaqueous solvent such as an organic solvent, from the viewpoint of electrical characteristics and easy handlability. Examples of the solvent for the nonaqueous electrolytic solution include chain esters, such as dimethyl carbonate, diethyl carbonate, ethyl methyl carbonate, and methyl propione carbonate; cyclic esters having high dielectric constant, such as ethylene carbonate, propylene carbonate, butylene carbonate, and vinylene carbonate; and mixed solvents of a chain ester and a cyclic ester. Among them, a mixed solvent containing a chain ester serving as a main solvent with a cyclic ester is particularly preferred.

In preparation of a nonaqueous electrolytic solution, examples of the electrolyte salt to be dissolved in the solvent mentioned above include $LiClO_4$, $LiPF_6$, $LiBF_4$, $LiAsF_6$, $LiSbF_6$, $LiCF_3SO_3$, $LiC_4F_9SO_3$, $LiCF_3CO_2$, $Li_2C_2F_4(SO_3)_2$, $LiN(RfSO_2)(Rf'SO_2)$, $LiC(RfSO_2)_3$, $LiC_nF_{2n+1}SO_3$ (n≥2), and $LiN(RfOSO_2)_2$ [Rf and Rf' each represent a fluoroalkyl group]. They may be used singly or in combination of two or more species. Among the electrolyte salts mentioned above, a fluorine-containing organic lithium salt having a carbon number of 2 or greater is particularly preferred. This is because the fluorine-containing organic lithium salt is high in anionic property and readily undergoes electrolytic dissociation, and is thus readily dissolvable in the solvent mentioned above. No particular limitation is imposed on the electrolyte salt concentration of the nonaqueous electrolytic solution. However, for example, the concentration is 0.3 mol/L to 1.7 mol/L, more preferably 0.4 mol/L to 1.5 mol/L.

Any anode active material may be used in the anode 14, so long as the material can store and release lithium ions. For example, there are used carbonaceous materials, such as graphite, pyrolytic carbon, coke, glassy carbon, a fired product of organic polymer compound, mesocarbon microbeads, carbon fiber, and activated carbon. Also, there may be used, as the anode active material, an alloy which contains metallic lithium, silicon, tin, indium, or the like; an oxide of silicon, tin, or the like which can perform charge and discharge at low electric potential near that at which lithium does; and a lithium-storing material, such as a nitride of lithium and cobalt such as $Li_{2.6}Co_{0.4}N$. Further, a portion of graphite may be replaced with a metal which can be alloyed with lithium, or with an oxide. When graphite is used as the anode active material, the voltage at full charge can be considered to be about 0.1 V (vs. lithium); thus, the electric potential of the cathode 15 can be conveniently calculated as a cell voltage plus 0.1 V. Therefore, since the electric potential of the cathode 15 at charging is readily controlled, graphite is preferred.

Figure 1B:
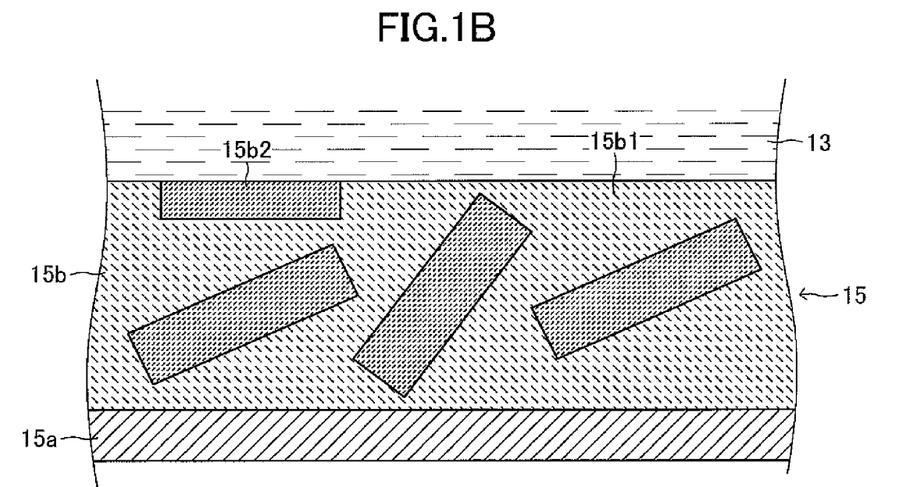
FIG. 1B is an enlarged sectional view of a cathode shown in FIG. 1A.

FIG. 1B is an enlarged sectional view of the cathode 15 shown in FIG. 1A. Referring to FIG. 1B, the cathode 15 includes a cathode collector 15a and a cathode active material layer 15b. The cathode active material layer 15b is composed of a binder 15b1 and plate-like particles 15b2 for cathode active material.

Since the basic configurations of the lithium secondary battery 10 and the cathode 15 (including materials used to form the cell casing 11, the separator 12, the electrolyte 13, the anode 14, the cathode collector 15a, and the binder 15b1) shown in FIGS. 1A and 1B are well known, detailed description thereof is omitted herein.

Figure 2A:
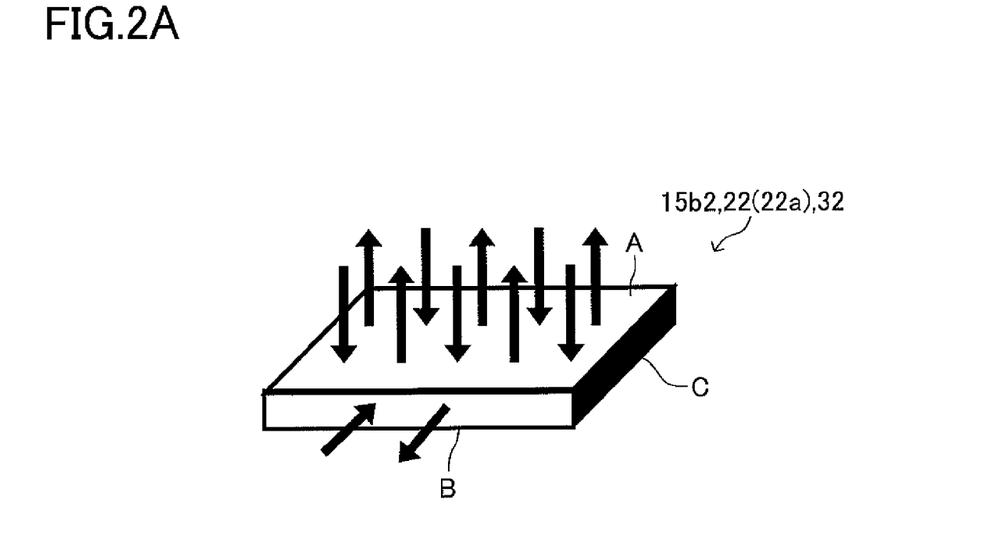
FIG. 2A is an enlarged perspective view of a plate-like particle for cathode active material shown in FIG. 1.
Figure 2B:
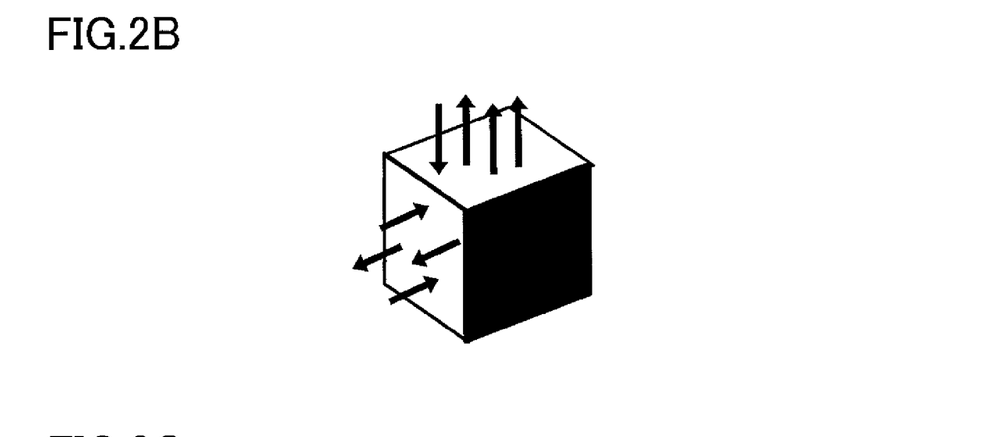
FIG. 2B is an enlarged perspective view of a cathode active material particle of a comparative example.
Figure 2C:
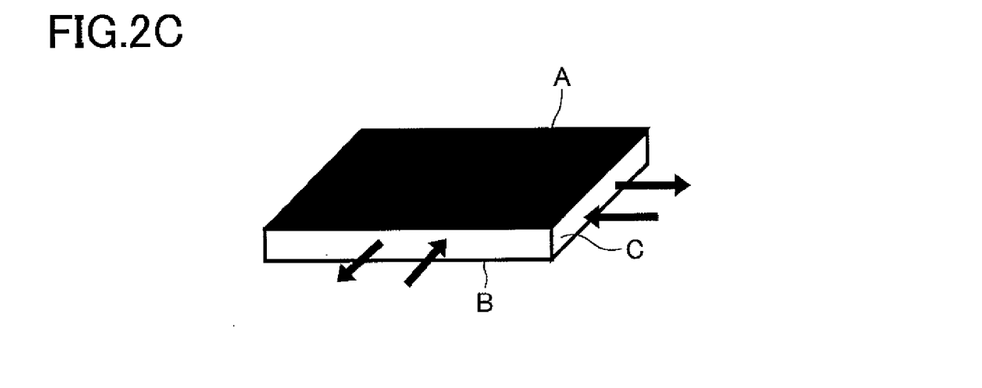
FIG. 2C is an enlarged perspective view of a cathode active material particle of a comparative example.

The plate-like particle 15b2 for cathode active material produced through one embodiment according to the production method of the present invention is a sintered plate of a lithium complex oxide (lithium transition metal oxide) having a layered rock salt structure and is formed into a plate-like form having a thickness of about 2 μm to about 100 μm. a particle FIG. 2A is an enlarged perspective view of the plate-like particle 15b2 for cathode active material shown in FIG. 1. FIGS. 2B and 2C are enlarged perspective views of cathode active material particles of comparative examples.

As shown in FIG. 2A, the plate-like particle 15b2 for cathode active material is formed such that planes other than the (003) plane (e.g., the (101) plane and the (104) plane) are exposed at a plate surface (upper surface A and lower surface B: hereinafter, the "upper surface A" and the "lower surface B" are referred to as the "plate surface A" and the "plate surface B," respectively), which is a surface normal to the thickness direction (the vertical direction in the drawings).

That is, the plate-like particle 15b2 for cathode active material is formed such that planes other than the (003) plane (e.g., the (104) plane) are oriented in parallel with the plate surfaces A and B of the particle. Specifically, the plate-like particle 15b2 for cathode active material is formed such that the ratio of intensity of X-ray diffraction by the (003) plane to intensity of X-ray diffraction by the (104) plane; i.e., the peak intensity ratio [003]/[104] falls within a range of 0.005 to 1.0. The (003) planes (colored black in the drawing) may be exposed at the end surfaces C, which intersect the plate surface direction (in-plane direction).

In contrast, the particle of a comparative example shown in FIG. 2B is formed into an isotropic shape rather than a thin plate. The particle of a comparative example shown in FIG. 2C is in the form of a thin plate, but is formed such that the (003) planes are exposed at the opposite surfaces (plate surfaces A and B) located in the thickness direction of the particle. The particles of these comparative examples are produced by conventional production methods.

<Configuration of Lithium Secondary Battery 2: Full-Solid Type>

Figure 3A:
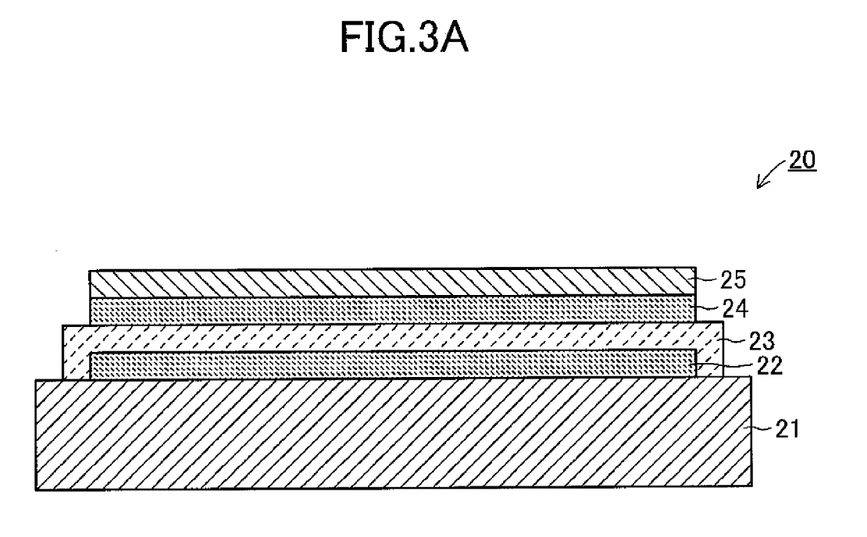
FIG. 3A is a sectional view of the schematic configuration of another embodiment of the lithium secondary battery.

In FIG. 3A, a lithium secondary battery 20 is of a so-called full-solid type and has a cathode collector 21, a cathode active material layer 22, a solid electrolyte layer 23, an anode active material layer 24, and an anode collector 25. The lithium secondary battery 20 is formed by sequentially stacking the cathode active material layer 22, the solid electrolyte layer 23, the anode active material layer 24, and the anode collector 25 on the cathode collector 21.

Since the basic configurations of the lithium secondary battery 20 (including materials used to form the cathode collector 21, the solid electrolyte layer 23, the anode active material layer 24, and the anode collector 25) shown in FIG. 3A are well known, detailed description thereof is omitted herein.

Figure 3B:
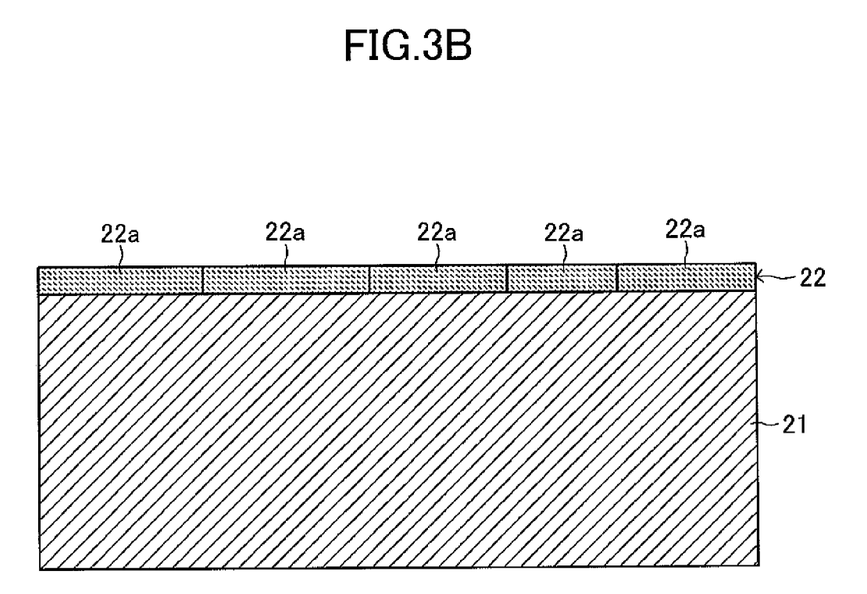
FIG. 3B is an enlarged sectional view of a cathode active material layer shown in FIG. 3A.

FIG. 3B is an enlarged sectional view of the cathode active material layer 22 shown in FIG. 3A. Referring to FIG. 3B, the cathode active material layer 22 produced through one embodiment according to the production method of the present invention is formed such that a large number of plate-like small particles (or crystallites) 22a are arranged on the plate surface to form a film. These plate-like small particles 22a have the same structural features as those of the plate-like particle 15b2 for cathode active material of the aforementioned embodiment (for example, planes other than the (003) plane (e.g., the (104) plane) are exposed to surfaces having a normal direction along the thickness direction (upper and lower surfaces in the drawing)).

<Configuration of Lithium Secondary Battery 3: Polymer Type>

Figure 4:
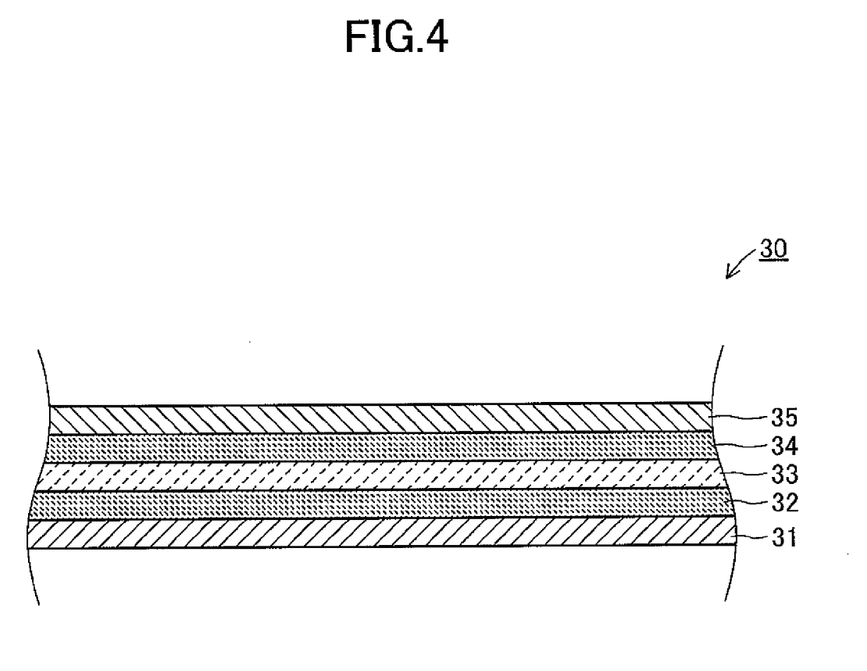
FIG. 4 is a sectional view of the schematic configuration of still another embodiment of the lithium secondary battery.

In FIG. 4, a lithium secondary battery 30 is of a so-called polymer type and has a cathode collector 31, a cathode active material layer 32, a polymer electrolyte layer 33, an anode active material layer 34, and an anode collector 35. The lithium secondary battery 30 is formed by sequentially stacking the cathode active material layer 32, the polymer electrolyte layer 33, the anode active material layer 34, and the anode collector 35 on the cathode collector 31. The cathode active material layer 32 produced through one embodiment according to the production method of the present invention has the same configuration as that of the aforementioned cathode active material layer 22 (see FIG. 3B).

<Outline of Method for Producing Plate-Like Particles for Cathode Active Material and Cathode Active Material Layer>

The plate-like particles 15b2 for cathode active material, the cathode active material layer 22, and the cathode active material layer 32 are readily and reliably produced through the following production method.

(1) Forming Step

A compact (green sheet) containing, as raw substances, a lithium compound serving as a first ingredient, a compound of a transition metal other than lithium serving as a second ingredient, and at least one of boron oxide ($B_2O_3$) and vanadium oxide ($V_2O_5$) serving as a third ingredient is formed.

(2) Firing Step

The compact which has been produced in the forming step is fired at 700 to 1,300° C., whereby the cathode active material layers 22 and 32 are produced.

(3) Crushing Step

For producing the plate-like particles 15b2 for cathode active material, the fired product sheet which has been produced in the firing step is crushed into a large number of plate-like particles (cathode active material particles).

One employable method for forming a compact is a doctor blade process employing a slurry containing material particles. Alternatively, a drum drier may be used for formation of a compact; specifically, a slurry which contains material is applied onto a heated drum, and then the dried material is scraped off with a scraper. A disk drier may also be used; specifically, slurry is applied onto a heated disk surface, and then the dried material is scraped off with a scraper. Also, hollow granules obtained by appropriately modulating the conditions of a spray drier can be regarded as a sheet-like compact having curvature and thus can be preferably employed as a compact. Further, an extrusion molding process employing a clay-like material which contains raw material particles may be employed as a compact forming method.

In one mode of the doctor blade process, a slurry is applied onto a flexible plate (e.g., an organic polymer plate such as a polyethylene terephthalate (PET) film), and the applied slurry is dried and solidified into a compact. The compact is then separated from the plate, thereby yielding a green compact. Preferably, the slurry is prepared so as to have a viscosity of 500 to 4,000 cP and is also defoamed under reduced pressure. In the preparation of the slurry or body material before forming or molding thereof, inorganic particles may be dispersed in an appropriate dispersion medium, and then a binder, a plasticizer, or the like may be added as appropriate.

The thickness of a compact is preferably 50 μm or less, more preferably 20 μm or less. Preferably, the thickness of the compact is 2 μm or greater. When the thickness is 2 μm or greater, a self-standing sheet (self-standing film)-like compact can be readily formed. Since the thickness of the sheet-like compact is substantially equal to the thickness of a plate-like particle, the thickness is appropriately modified depending on the applications of the plate-like particles.

The firing temperature is preferably 700° C. to 1,300° C. When the temperature is lower than 700° C., grain growth becomes insufficient, and the degree of orientation becomes low. When the temperature is higher than 1,300° C., decomposition and volatilization undesirably progress. The firing time is preferably 1 hour to 50 hours. When the time is shorter than one hour, the degree of orientation becomes low, whereas when the time is longer than 50 hours, energy consumption becomes excessively large. The atmosphere of firing is appropriately provided such that decomposition does not progress during firing. In the case where volatilization of lithium progresses, a lithium atmosphere is preferably established through disposition of lithium carbonate or the like within the same sheath. In the case where release of oxygen and reduction progress during firing, firing is preferably carried out in an atmosphere having high oxygen partial pressure.

In one mode of the crushing step, a fired sheet-like compact is placed on a mesh having a predetermined mesh size, and then a spatula is pressed against the sheet from above, whereby the sheet is crushed into a large number of plate-like particles.

SPECIFIC EXAMPLES

Next will be described in detail specific examples of the production method mentioned above, and the results of evaluation of particles produced by the specific example methods.

Example 1

Specific Example 1

Cobalt-Nickel-Manganese Ternary System

<Production Method>

$B_2O_3$ (particle size: 1 to 10 μm; product of Kanto Chemical Inc.) (5.0 parts by weight) was added to a mixture of $Li_2CO_3$ powder (particle size: 10 to 50 μm; product of Kanto Chemical Inc.) (18.2 parts by weight), $Co_3O_4$ powder (particle size: 1 to 5 μm; product of Seido Kagaku Kogyo Co., Ltd.) (27.1 parts by weight), NiO powder (particle size: 1 to 10 μm; product of Seido Kagaku Kogyo Co., Ltd.) (25.3 parts by weight), and $MnCO_3$ powder (particle size: 1 to 10 μm; product of Tosoh Corp.) (29.4 parts by weight), and the resultant mixture was pulverized by means of a pot mill to a mean particle size of 0.5 μm. The resultant powder (100 parts by weight) was mixed with a dispersion medium (toluene:isopropanol=1:1) (100 parts by weight), a binder (polyvinyl butyral: product No. BM-2; product of Sekisui Chemical Co. Ltd.) (10 parts by weight), a plasticizer (DOP: di(2-ethylhexyl) phthalate; product of Kurogane Kasei Co., Ltd.) (4 parts by weight), and a dispersant (product name RHEODOL SP-O30, product of Kao Corp.) (2 parts by weight). The resultant mixture was stirred under reduced pressure for defoaming, and the viscosity thereof was adjusted to 3,000 to 4,000 cP. The viscosity was measured by means of an LVT-type viscometer, a product of Brookfield Co., Ltd.

The thus-prepared slurry was formed into a sheet on a PET film through the doctor blade process such that the thickness of the sheet as measured after drying was adjusted to 16 μm.

The sheet product was removed from the PET film and was cut into square pieces (30 mm×30 mm) by means of a cutter. Each piece was placed at the center of a setter (dimensions: 90 mm square×1 mm high) made of zirconia and embossed in such a manner as to have a protrusion size of 300 μm. The embossed piece was fired at 900° C. for 10 hours, and the portion of the piece which was not fused to the setter was taken out.

The $Li(Ni_{1/3}Mn_{1/3}Co_{1/3})O_2$ ceramic sheet which had been yielded through firing was placed on a polyester mesh having a mean opening diameter of 100 μm, and then a spatula was lightly pressed against the ceramic sheet so as to cause the ceramic sheet to pass through the mesh for crushing, to thereby yield powdered $Li(Ni_{1/3}Mn_{1/3}Co_{1/3})O_2$ (particle thickness: 10 μm).

In a similar manner and with the same materials, a self-standing $Li(Ni_{1/3}Mn_{1/3}Co_{1/3})O_2$ ceramic sheet having a thickness of 10 μm was produced. In this case, the aforementioned crushing step by means of a mesh was not performed.

<Evaluation Methods>

The crystal facet orientation degree and cell characteristics were evaluated through the following procedures.

<<Evaluation of Crystal Facet Orientation Degree>>

XRD (X-ray diffraction) measurement was carried out by the following method. Specifically, a mixture prepared by adding plate-like particles (0.1 g) to ethanol (2 g) was subjected to dispersion for 30 minutes by means of an ultrasonic diffuser (ultrasonic cleaner); and the resultant dispersion liquid was spin-coated at 2,000 rpm onto a glass substrate measuring 25 mm×50 mm so as to make overlap of the plate-like particles as little as possible and to bring crystal facets in parallel with the glass substrate surface. By means of an XRD apparatus (GEIGER FLEX RAD-IB, product of Rigaku Corp.), the surfaces of the plate-like particles were irradiated with X-ray so as to measure an XRD profile, thereby obtaining the ratio of intensity (peak height) of diffraction by the (003) plane to intensity (peak height) of diffraction by the (104) plane, [003]/[104]. In the method mentioned above, the plate surface of the plate-like particles are in surface contact with the glass substrate surface, so that the particle plate surface is in parallel with the glass substrate surface. Thus, according to the method mentioned above, a profile of diffraction by crystal facets present in parallel with crystal faces of the particle plate surface is obtained.

<<Evaluation of Cell Characteristics>>

In order to evaluate cell characteristics attributable to plate-like particles for cathode active material (plate-like particles 15b2 for cathode active material), a cell was fabricated in the following manner.

The plate-like particles for cathode active material produced in Example 1, acetylene black, and polyvinylidene fluoride (PVDF) were mixed at proportions by mass of 75:20:5, thereby preparing a cathode material. The thus-prepared cathode material (0.02 g) was compacted to a disk having a diameter of 20 mm under a pressure of 300 kg/cm$^2$, thereby yielding a cathode active material layer.

The thus-produced cathode active material layer, an anode formed of a lithium metal plate, stainless steel collector plates, and a separator were arranged in the order of collector plate—cathode active material layer—separator—anode—collector plate. The resultant stacked body was filled with an electrolytic solution, thereby yielding a coin cell. The electrolytic solution was prepared by dissolving $LiPF_6$ in an equivolume mixture of ethylene carbonate (EC) and diethyl carbonate (DEC) serving as an organic solvent to a concentration of 1 mol/L.

In order to evaluate cell characteristics attributable to cathode active material film (cathode active material layers 22 and 32), a cell was fabricated in the following manner.

Through sputtering, Au was deposited on one side of a self-standing cathode active material film having a diameter of about 16 mm so as to form a current collection layer (thickness: 500 Å), thereby yielding a cathode plate. The thus-produced cathode plate, an anode formed from a lithium metal plate, stainless steel collector plates, and a separator were arranged in the order of collector plate—cathode—separator—anode—collector plate. The resultant stacked body was filled with an electrolytic solution in a manner similar to that mentioned above, thereby yielding a coin cell.

The thus-fabricated coin cell was evaluated in terms of cell capacity (discharge capacity) and percent capacity maintenance.

One cycle consists of the following charge and discharge operations: constant-current charge is carried out at 0.1 C rate of current until the cell voltage becomes 4.2 V; subsequently, constant-voltage charge is carried out under a current condition of maintaining the cell voltage at 4.2 V, until the current drops to 1/20, followed by 10 minutes rest; and then, constant-current discharge is carried out at 1 C rate of current until the cell voltage becomes 3.0 V, followed by 10 minutes rest. Three cycles in total were repeated under a condition of 25° C. The discharge capacity in the third cycle was measured.

The fabricated cell was subjected to cyclic charge-discharge at a test temperature of 25° C. The cyclic charge-discharge repeats: (1) charge at IC rate of constant current and constant voltage until 4.2 V is reached, and (2) discharge at 1 C rate of constant current until 3.0 V is reached. The percent capacity maintenance (%) was defined as a value obtained by dividing the discharge capacity of the cell as measured after 100 repetitions of cyclic charge-discharge by the initial discharge capacity of the cell.

<<Results of Evaluations>>

In the aforementioned production example (hereinafter referred to as Experimental Example 1), the [003]/[104] peak intensity ratio was found to be 0.8, indicating that a structure in which the lithium ion intercalation/deintercalation surface was oriented in a plate surface was obtained. Accordingly, the plate-like particles for cathode active material and the cathode active material film exhibited a discharge capacity as high as 112 mAh/g and 85 mAh/g, and a percent capacity maintenance (cycle characteristics) as high as 97% and 98%, respectively.

The conditions employed in Experimental Example 1 were modified as shown in Table 1, and the same test was performed. Table 2 shows the results.

TABLE 1

| | $B_2O_3$ amount [wt. parts] | $B_2O_3$ content [wt. %] | $V_2O_5$ amount [wt. parts] | $V_2O_5$ content [wt. %] | $B_2O_3$ + $V_2O_5$ total amount [wt. %] | $B_2O_3/V_2O_5$ ratio by mole | Firing conditions temp. [° C.] | time [h] |
|---|---|---|---|---|---|---|---|---|
| Ex. 1 | 5 | 4.8 | — | — | 4.8 | — | 950 | 10 |
| Ex. 2 | 5 | 4.8 | — | — | 4.8 | — | 1,000 | 10 |
| Ex. 3 | 5 | 4.8 | — | — | 4.8 | — | 1,000 | 5 |
| Ex. 4 | — | — | 5 | 4.8 | 4.8 | — | 1,000 | 5 |
| Ex. 5 | 0.5 | 0.5 | — | — | 0.5 | — | 1,000 | 5 |
| Ex. 6 | 10 | 9.1 | — | — | 9.1 | — | 1,000 | 5 |
| Ex. 7 | 30 | 23.1 | — | — | 23.1 | — | 1,000 | 5 |
| Ex. 8 | — | — | 0.5 | 0.5 | 0.5 | — | 1,000 | 5 |
| Ex. 9 | — | — | 10 | 9.1 | 9.1 | — | 1,000 | 5 |
| Ex. 10 | — | — | 30 | 23.1 | 23.1 | — | 1,000 | 5 |
| Ex. 11 | 1 | 1.0 | 2 | 2.0 | 3.0 | 1.3 | 1,000 | 5 |
| Ex. 12 | 3 | 2.9 | 1 | 1.0 | 3.9 | 7.8 | 1,000 | 5 |
| Comp. Ex. 1 | — | — | — | — | — | — | 1,000 | 5 |
| Comp. Ex. 2 | 40 | 28.6 | — | — | 28.6 | — | 1,000 | 5 |
| Comp. Ex. 3 | — | — | 40 | 28.6 | 28.6 | — | 1,000 | 5 |

TABLE 2

| | [003]/[104] peak intensity ratio | Plate-like particles Discharge capacity [mAh/g] | Plate-like particles Percent capacity maintenance [%] | Active material film Discharge capacity [mAh/g] | Active material film Percent capacity maintenance [%] |
|---|---|---|---|---|---|
| Ex. 1 | 0.8 | 112 | 97 | 85 | 98 |
| Ex. 2 | 0.63 | 129 | 97 | 103 | 98 |
| Ex. 3 | 0.7 | 120 | 97 | 98 | 98 |
| Ex. 4 | 0.78 | 117 | 97 | 95 | 98 |
| Ex. 5 | 1 | 103 | 98 | 77 | 98 |
| Ex. 6 | 0.2 | 153 | 95 | 110 | 96 |
| Ex. 7 | 0.52 | 132 | 95 | 102 | 96 |
| Ex. 8 | 0.88 | 107 | 97 | 80 | 98 |
| Ex. 9 | 0.44 | 132 | 96 | 110 | 97 |
| Ex. 10 | 0.65 | 149 | 96 | 120 | 97 |
| Ex. 11 | 0.04 | 162 | 94 | 140 | 95 |
| Ex. 12 | 0.1 | 157 | 94 | 132 | 95 |
| Comp. Ex. 1 | 3.5 | 60 | 97 | 35 | 98 |
| Comp. Ex. 2 | 1.5 | 72 | 86 | 50 | 87 |
| Comp. Ex. 3 | 1.8 | 83 | 85 | 52 | 86 |

In Experimental Example 2, the firing temperature was adjusted to 1,000° C. (the other conditions were the same as those employed in Experimental Example 1). As compared with Experimental Example 1, the [003]/[104] peak intensity ratio was reduced, and the orientation degree of the lithium ion intercalation/deintercalation surface increased, and the cell capacity increased. In Experimental Example 3, the retention time at the highest temperature during the firing step was adjusted to 5 hours (the other conditions were the same as those employed in Experimental Example 2). As compared with Experimental Example 2, the [003]/[104] peak intensity ratio slightly increased, and the cell capacity slightly decreased. However, productivity increased by virtue of shortening of the firing time.

In Experimental Example 4, $V_2O_5$ (particle size: 1 to 10 μm, product of Sigma Aldrich Japan) was used instead of $B_2O_3$ (the other conditions were the same as those employed in Experimental Example 3). Clearly, $V_2O_5$ was found to exhibit the same effect as that of $B_2O_3$.

In Experimental Example 5, the amount of $B_2O_3$ added was reduced to 0.5 parts by weight (the other conditions were the same as those employed in Experimental Example 3). As a result, the [003]/[104] peak intensity ratio increased, and the orientation degree of the lithium ion intercalation/deintercalation surface decreased. However, the cell capacity was found to increase, as compared with Comparative Example 1 (no $B_2O_3$ was added). When the amount of $B_2O_3$ or the amount of $V_2O_5$ was controlled to fall within a range of 0.4 to 25 wt. %, excellent cell capacity and cycle characteristics were attained (Experimental Examples 6 to 10). As in the cases of Experimental Examples 11 and 12, particularly when both $B_2O_3$ and $V_2O_5$ were added with the $B_2O_3/V_2O_5$ ratio by mole being adjusted to fall within a range of 1 to 10, a high orientation degree was attained by use of $B_2O_3$ and $V_2O_5$ even in small amounts.

In contrast, in the cases of Comparative Example 1 (neither $B_2O_3$ nor $V_2O_5$ was added), Comparative Example 2 (the amount of $B_2O_3$ exceeded the upper limit), and Comparative Example 3 (the amount of $V_2O_5$ exceeded the upper limit), the (003) plane, through which lithium ions cannot be intercalated and deintercalated, was oriented in a plate surface, and the cell capacity decreased.

Example 2

Specific Example 2

Cobalt-Nickel System

<Production Method>

$B_2O_3$ powder (particle size: 1 to 10 μm; product of Kanto Chemical Inc.) (5 parts by weight) was added to a mixture of $Li_2CO_3$ powder (particle size: 10 to 50 μm; product of Kanto Chemical Inc.) (33.1 parts by weight), NiO powder (particle size: 1 to 10 μm; product of Seido Kagaku Kogyo Co., Ltd.) (50.2 parts by weight), $Co_3O_4$ powder (particle size: 1 to 5 μm; product of Seido Kagaku Kogyo Co., Ltd.) (14.4 parts by weight), and $Al_2O_3$ powder (particle size: 1 to 10 μm; product of Showa Denko K.K.) (2.3 parts by weight), and the resultant mixture was pulverized by means of a pot mill to a mean particle size of 0.5 μm. The resultant powder (100 parts by weight) was mixed with a dispersion medium (toluene:isopropanol=1:1) (100 parts by weight), a binder (polyvinyl butyral:product No. BM-2; product of Sekisui Chemical Co. Ltd.) (10 parts by weight), a plasticizer (DOP: di(2-ethylhexyl) phthalate; product of Kurogane Kasei Co., Ltd.) (4 parts by weight), and a dispersant (product name RHEODOL SP-O30, product of Kao Corp.) (2 parts by weight). The resultant mixture was stirred under reduced pressure for defoaming, and the viscosity thereof was adjusted to 3,000 to 4,000 cP.

The thus-prepared slurry was formed into a sheet on a PET film through the doctor blade process such that the thickness of the sheet as measured after drying was adjusted to 16 μm.

The sheet product was removed from the PET film and was cut into square pieces (30 mm×30 mm) by means of a cutter. Each piece was placed at the center of a setter (dimensions: 90 mm square×1 mm high) made of zirconia and embossed in such a manner as to have a protrusion size of 300 μm. The embossed piece was fired at 750° C. for 10 hours, and the portion of the piece which was not fused to the setter was taken out.

The $Li(Ni_{0.75}Co_{0.2}Al_{0.05})O_2$ ceramic sheet which had been yielded through firing was placed on a polyester mesh having a mean opening diameter of 100 μm, and then a spatula was lightly pressed against the ceramic sheet so as to cause the ceramic sheet to pass through the mesh for crushing, to thereby yield powdered $Li(Ni_{0.75}Co_{0.2}Al_{0.05})O_2$ (particle thickness: 10 μm).

In a similar manner and with the same materials, a self-standing $Li(Ni_{0.75}Co_{0.2}Al_{0.05})O_2$ ceramic sheet having a thickness of 10 μm was produced. In this case, the aforementioned crushing step by means of a mesh was not performed.

<Evaluations>

As well as Specific Example 1 (cobalt-nickel-manganese ternary system), evaluations were carried out under modification of production conditions. Table 3 shows the production conditions (Experimental Example 13 satisfies the aforementioned conditions), and Table 4 shows the results of evaluation. As is clear from Tables 3 and 4, the same results as obtained in Specific Example 1 (cobalt-nickel-manganese ternary system) were also obtained in Specific Example 2 (cobalt-nickel system).

TABLE 3

| | $B_2O_3$ amount [wt. parts] | $B_2O_3$ content [wt. %] | $V_2O_5$ amount [wt. parts] | $V_2O_5$ content [wt. %] | $B_2O_3$ + $V_2O_5$ total amount [wt. %] | $B_2O_3/V_2O_5$ ratio by mole | Firing conditions temp. [° C.] | time [h] |
|---|---|---|---|---|---|---|---|---|
| Ex. 13 | 5 | 4.8 | — | — | 4.8 | — | 750 | 10 |
| Ex. 14 | 5 | 4.8 | — | — | 4.8 | — | 800 | 10 |
| Ex. 15 | 5 | 4.8 | — | — | 4.8 | — | 800 | 5 |
| Ex. 16 | — | — | 5 | 4.8 | 4.8 | — | 800 | 5 |
| Ex. 17 | 0.5 | 0.5 | — | — | 0.5 | — | 800 | 5 |
| Ex. 18 | 10 | 9.1 | — | — | 9.1 | — | 800 | 5 |
| Ex. 19 | 30 | 23.1 | — | — | 23.1 | — | 800 | 5 |
| Ex. 20 | — | — | 0.5 | 0.5 | 0.5 | — | 800 | 5 |
| Ex. 21 | — | — | 10 | 9.1 | 9.1 | — | 800 | 5 |
| Ex. 22 | — | — | 30 | 23.1 | 23.1 | — | 800 | 5 |
| Ex. 23 | 1 | 1.0 | 2 | 2.0 | 3.0 | 1.3 | 800 | 5 |
| Ex. 24 | 3 | 2.9 | 1 | 1.0 | 3.9 | 7.8 | 800 | 5 |
| Comp. Ex. 4 | — | — | — | — | — | — | 800 | 5 |
| Comp. Ex. 5 | 40 | 28.6 | — | — | 28.6 | — | 800 | 5 |
| Comp. Ex. 6 | — | — | 40 | 28.6 | 28.6 | — | 800 | 5 |

TABLE 4

| | [003]/[104] peak intensity ratio | Plate-like particles | | Active material film | |
|---|---|---|---|---|---|
| | | Discharge capacity [mAh/g] | Percent capacity maintenance [%] | Discharge capacity [mAh/g] | Percent capacity maintenance [%] |
| Ex. 13 | 0.82 | 110 | 97 | 84 | 98 |
| Ex. 14 | 0.62 | 125 | 96 | 102 | 97 |
| Ex. 15 | 0.71 | 120 | 97 | 95 | 98 |

TABLE 4-continued

| | [003]/[104] peak intensity ratio | Plate-like particles | | Active material film | |
|---|---|---|---|---|---|
| | | Discharge capacity [mAh/g] | Percent capacity maintenance [%] | Discharge capacity [mAh/g] | Percent capacity maintenance [%] |
| Ex. 16 | 0.75 | 122 | 97 | 93 | 98 |
| Ex. 17 | 0.99 | 105 | 98 | 84 | 98 |
| Ex. 18 | 0.19 | 155 | 96 | 132 | 97 |
| Ex. 19 | 0.55 | 140 | 95 | 114 | 96 |
| Ex. 20 | 0.87 | 110 | 97 | 89 | 98 |
| Ex. 21 | 0.65 | 135 | 96 | 108 | 97 |
| Ex. 22 | 0.42 | 152 | 96 | 124 | 97 |
| Ex. 23 | 0.04 | 162 | 94 | 135 | 95 |
| Ex. 24 | 0.09 | 158 | 94 | 132 | 95 |
| Comp. Ex. 4 | 3.8 | 68 | 97 | 44 | 98 |
| Comp. Ex. 5 | 1.8 | 64 | 85 | 58 | 86 |
| Comp. Ex. 6 | 2.2 | 86 | 85 | 62 | 86 | mm square×1 mm high) made of zirconia and embossed in such a manner as to have a protrusion size of 300 μm. The embossed piece was fired at 850° C. for 10 hours, and the portion of the piece which was not fused to the setter was taken out.

The $LiCoO_2$ ceramic sheet which had been yielded through firing was placed on a polyester mesh having a mean opening diameter of 100 μm, and then a spatula was lightly pressed against the ceramic sheet so as to cause the ceramic sheet to pass through the mesh for crushing, to thereby yield powdered $LiCoO_2$ (particle thickness: 10 μm).

In a similar manner and with the same materials, a self-standing $LiCoO_2$ ceramic sheet having a thickness of 10 μm was produced. In this case, the aforementioned crushing step by means of a mesh was not performed.

As well as Experimental Example 11 of Specific Example 1, in the Production Example (Experimental Example 25), both $B_2O_3$ and $V_2O_5$ were added, and the $B_2O_3/V_2O_5$ mole ratio was adjusted to fall within a range of 1 to 10. As shown in Table 5, the product of Experimental Example 26 was also evaluated similar to that of Experimental Example 12 of Specific Example 1. As in the cases of Experimental Examples 11 and 12 of Specific Example 1, a high orientation degree was attained by use of $B_2O_3$ and $V_2O_5$ even in small amounts in Experimental Examples 25 and 26.

TABLE 5

| | $B_2O_3$ amount [wt. parts] | $B_2O_3$ content [wt. %] | $V_2O_5$ amount [wt. parts] | $V_2O_5$ content [wt. %] | $B_2O_3$ + $V_2O_5$ total amount [wt. %] | $B_2O_3/V_2O_5$ ratio by mole | Firing conditions | |
|---|---|---|---|---|---|---|---|---|
| | | | | | | | temp. [° C.] | time [h] |
| Ex. 25 | 1 | 1.0 | 2 | 2.0 | 3.0 | 1.3 | 850 | 5 |
| Ex. 26 | 3 | 2.9 | 1 | 1.0 | 3.9 | 7.8 | 850 | 5 |

Example 3

Specific Example 3

Cobalt System

<Production Method>

$B_2O_3$ (particle size: 1 to 10 μm; product of Kanto Chemical Inc.) (1 part by weight) and $V_2O_5$ (particle size: 1 to 10 μm, product of Sigma Aldrich Japan) (2 parts by weight) were added to a mixture of $Li_2CO_3$ powder (particle size: 10 to 50 μm; product of Kanto Chemical Inc.) (31.5 parts by weight) and $Co_3O_4$ powder (particle size: 1 to 5 μm; product of Seido Kagaku Kogyo Co., Ltd.) (68.5 parts by weight), and the resultant mixture was pulverized by means of a pot mill to a mean particle size of 0.5 μm. The resultant powder (100 parts by weight) was mixed with a dispersion medium (toluene:isopropanol=1:1) (100 parts by weight), a binder (polyvinyl butyral: product No. BM-2; product of Sekisui Chemical Co. Ltd.) (10 parts by weight), a plasticizer (DOP: di(2-ethylhexyl) phthalate; product of Kurogane Kasei Co., Ltd.) (4 parts by weight), and a dispersant (product name RHEODOL SP-O30, product of Kao Corp.) (2 parts by weight). The resultant mixture was stirred under reduced pressure for defoaming, and the viscosity thereof was adjusted to 3,000 to 4,000 cP.

The thus-prepared slurry was formed into a sheet on a PET film through the doctor blade process such that the thickness of the sheet as measured after drying was adjusted to 16 μm.

The sheet product was removed from the PET film and was cut into square pieces (30 mm×30 mm) by means of a cutter. Each piece was placed at the center of a setter (dimensions: 90

TABLE 6

| | [003]/[104] peak intensity ratio | Plate-like particles | | Active material film | |
|---|---|---|---|---|---|
| | | Discharge capacity [mAh/g] | Percent capacity maintenance [%] | Discharge capacity [mAh/g] | Percent capacity maintenance [%] |
| Ex. 25 | 0.06 | 155 | 95 | 130 | 96 |
| Ex. 26 | 0.08 | 150 | 94 | 125 | 95 |

Effects of the Embodiment

Thus, in the plate-like particle 15b2 for cathode active material and the cathode active material layers 22, 32, which were produced by the production method of the embodiment (the aforementioned Specific Examples), the (104) planes, through which lithium ions are favorably intercalated and deintercalated, are oriented in parallel with the plate surface of the plate-like particle and are exposed at most of the surface of the plate-like particle. Meanwhile, the (003) planes, through which lithium ions cannot be intercalated and deintercalated, are merely slightly exposed at end surfaces of the plate-like particle (see FIG. 2A).

Thus, the planes through which lithium ions are favorably intercalated into and deintercalated from the electrolyte 13 (including that infiltrating into the binder 15b1) are exposed at the surface to a greater extent, whereas the (003) planes, through which lithium ions cannot be intercalated and deintercalated, are exposed at the surface to a very small extent. In the example of FIG. 2A, the (003) planes are exposed at the end surface C in the form of a plane. However, other structures may also be realized.

In conventional cathode active material particles (as shown in FIGS. 2B and 2C), reducing the particle size enhances rate characteristic because of an increase in specific surface area, but is accompanied by a deterioration in durability due to a deterioration in particle strength, and a reduction in capacity due to an increase in the percentage of a binder. In this manner, in typical (conventional) cathode active material particles, the rate characteristic is in trade-off relation with durability and capacity.

In contrast, in the plate-like particles 15b2 for cathode active material produced through the embodiment of the present invention, when the particle size is increased to thereby enhance durability and capacity, the total area of those planes through which lithium ions are readily released also increases, so that high rate characteristics are attained. Thus, according to the present invention, capacity, durability, and rate characteristics can be enhanced as compared with the state of the art.

Particularly, a lithium ion secondary battery for use in mobile equipment, such as cellphones and notebook-style PCs, is required to ensure high capacity for long hours of use. For attaining high capacity, increasing the packing fraction of an active material powder is effective, and the use of large particles having a particle size of 10 μm or greater is preferred in view of good packing performance.

In this regard, according to conventional techniques, an attempt to increase the particle size to 10 μm or greater leads to a plate-like particle in which the (003) planes, through which lithium ions and electrons cannot be intercalated and deintercalated, are exposed at a wide portion of the plate surface of the plate-like particle (see FIG. 2C) for the reason of crystal structure, potentially having an adverse effect on output characteristics.

In contrast, in the plate-like particles 15b2 for cathode active material produced through the embodiment of the present invention, lithium ion- and electron-conductive planes are widely exposed at the surface of the plate-like particle. Thus, the particle size of the plate-like particles 15b2 for cathode active material can be increased without the adverse effect on output characteristics. Therefore, the present invention can provide a cathode material sheet having high capacity and a packing fraction higher than that attained by a conventional technique.

The plate-like particle 15b2 for cathode active material, the cathode active material layer 22, and the cathode active material layer 32 have a thickness of preferably 2 μm to 100 μm, more preferably 5 μm to 50 μm, further preferably 5 μm to 20 μm. A thickness in excess of 100 μm is not preferred, in view of deterioration in rate characteristic, and sheet formability. The thickness of the plate-like particle 15b2 for cathode active material is desirably 2 μm or greater. A thickness less than 2 μm is not preferred, in view of the effect of increasing the packing fraction being small.

The plate-like particle 15b2 for cathode active material preferably has an aspect ratio of 4 to 20. When the aspect ratio is less than 4, the effect of expanding a lithium ion intercalation/deintercalation surface through orientation is small. When the aspect ratio is in excess of 20, in the case where the cathode active material layer 15b is filled with the plate-like particles 15b2 for cathode active material such that the plate surfaces of the plate-like particles 15b2 for cathode active material are in parallel with an in-plane direction of the cathode active material layer 15b, lithium ion diffusion paths in the thickness direction of the cathode active material layer 15b become longer, resulting in a deterioration in rate characteristics, which is not preferred.

<Examples of Modifications>

The above-described embodiment and specific examples are, as mentioned above, mere examples of the best mode of the present invention which the applicant of the present invention contemplated at the time of filing the present application. The above-described embodiment and specific examples should not be construed as limiting the invention. Various modifications to the above-described embodiment and specific examples are possible, so long as the invention is not modified in essence.

Several modifications will next be exemplified. In the following description of the modifications, component members similar in structure and function to those of the above-described embodiment are denoted by names and reference numerals similar to those of the above-described embodiment. The description of the component members appearing in the above description of the embodiment can be applied as appropriate, so long as no inconsistencies are involved.

Needless to say, modifications are not limited to those described below. Narrow interpretation of the present invention based on the embodiment described above and the following modifications impairs the interests of an applicant (particularly, an applicant who is motivated to file as quickly as possible under the first-to-file system) while unfairly benefiting imitators, and is thus impermissible.

The structure of the above-described embodiment and the structures of the modifications to be described below are entirely or partially applicable in appropriate combination, so long as no technical inconsistencies are involved.

The electrolyte which may be employed in the invention is an inorganic solid, an organic polymer, or a gel polymer (i.e., a gel-form organic polymer impregnated with electrolyte).

In the aforementioned modification, the cathode active material layer 22 is applied to a full-solid-type cell. Nevertheless, the present invention may also be applied to a liquid-type cell. Generally, the material for a cathode of a liquid-type cell is filled with an active material at a packing fraction of about 60%. In contrast, the active material film of the present invention achieves substantially a packing fraction of 100% while planes through which lithium ions are intercalated and deintercalated are arrayed over the entire film surface. That is, while deterioration in rate characteristics is minimized, a very high capacity is attained.

The cathode active material layer 22 and the cathode collector 21 may be merely in contact with each other at the interface therebetween or may be bonded together by the mediation of a thin layer of an electrically conductive binder, such as acetylene black. In the latter case, bending of the cathode collector 21 may cause cracking in the cathode active material layer 22. Nevertheless, such a crack is in parallel with the direction of conduction of electrons and ions. Thus, the occurrence of cracking does not raise any problem with respect to characteristics.

The surface of the cathode active material layer 22 may be polished to make it flat. In this case, in order to remove stress and defect which remain on the polished surface, heat treatment at 1,000° C. or lower may be conducted. The heat treatment improves adhesion between the cathode collector 21 and the solid electrolyte layer 23, and also improves charge-discharge characteristic because of exposure of active crystal facets.

Figure 5:
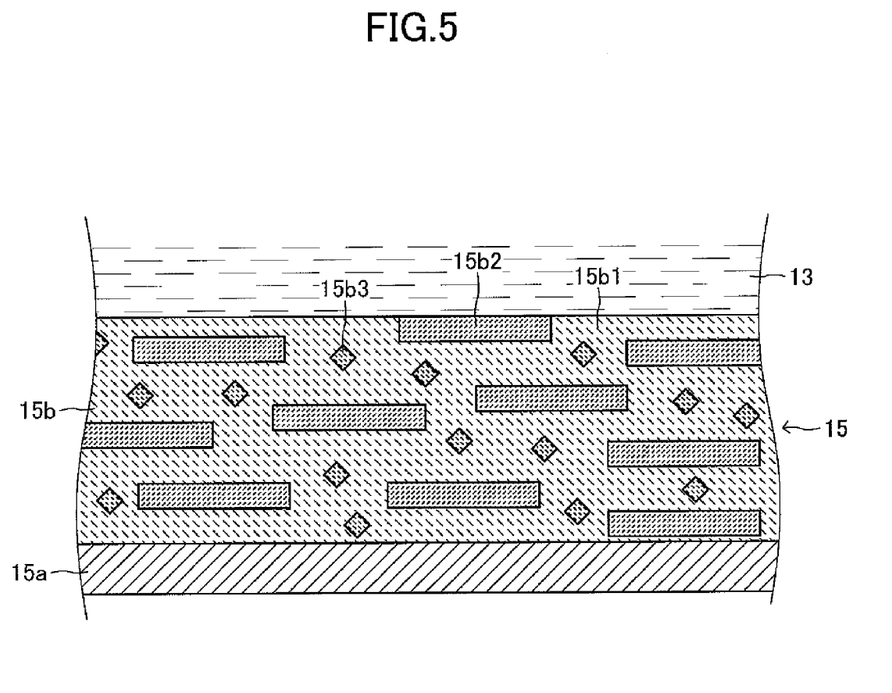
FIG. 5 is a sectional view of the configuration of a modification of the cathode shown in FIG. 1B.

For example, the plate-like particles 15b2 for cathode active material of the present invention having various sizes and shapes may be blended as appropriate in the cathode active material layer 15b. As shown in FIG. 5, the plate-like particles 15b2 for cathode active material produced through the production method of the present invention and conventional equiaxial particles 15b3 may be present in the cathode active material layer 15b at an appropriate mixing ratio. Specifically, through mixing equiaxial particles and the plate-like particles 15b2 having a thickness substantially equivalent to the particle size of the equiaxial particle at an appropriate mixing ratio, the particles can be efficiently arrayed, whereby the packing fraction can be enhanced.

Figure 6A:
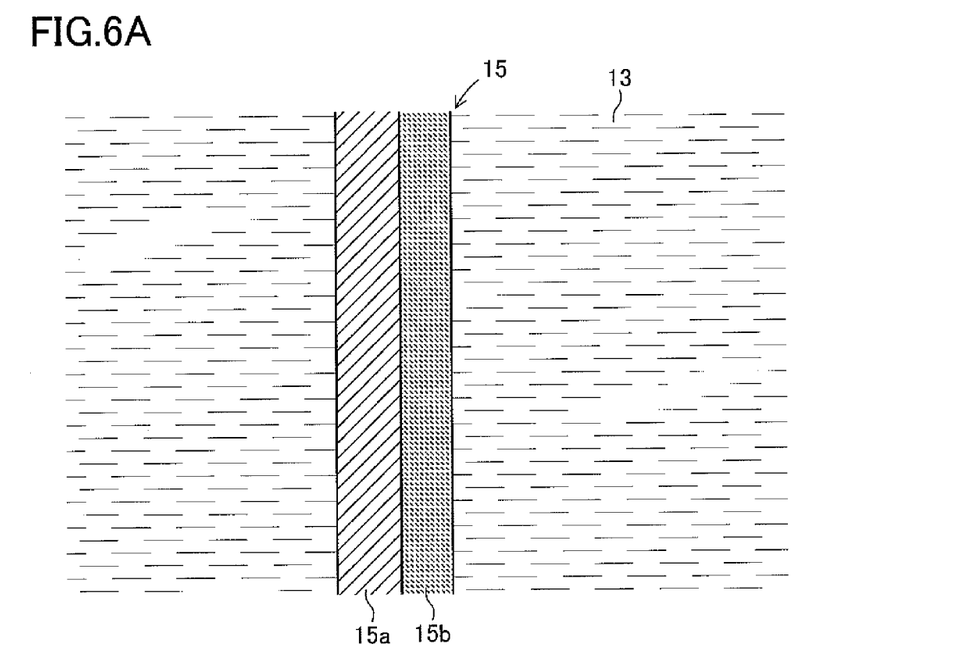
FIG. 6A is a sectional view of the configuration of a modification of the cathode shown in FIG. 1B.
Figure 6B:
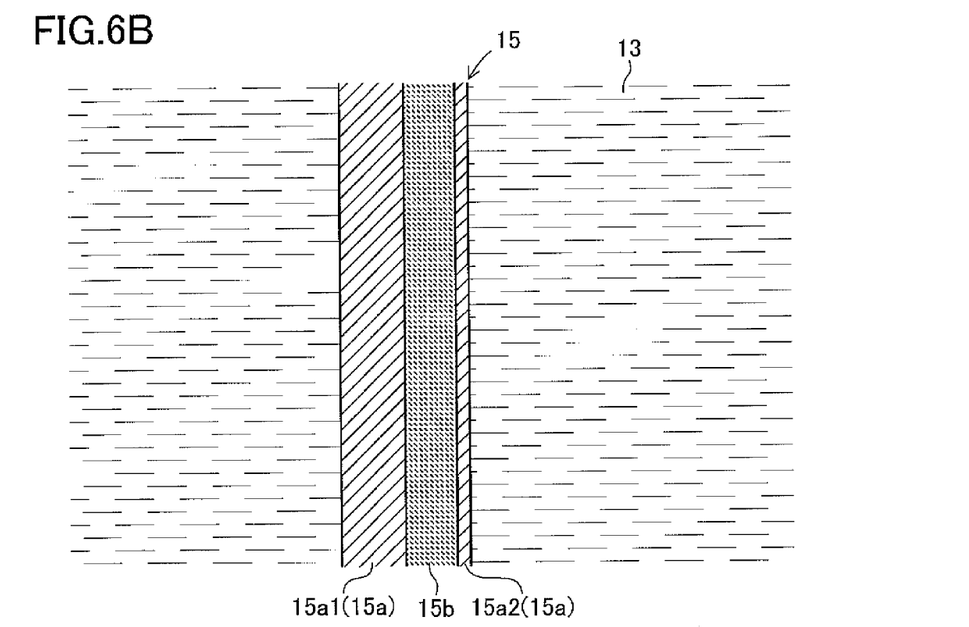
FIG. 6B is a sectional view of the configuration of a modification of the cathode shown in FIG. 1B.

As described above, in the case where the cathode active material layer 15b is a self-standing ceramic sheet (cathode active material film), the cathode collector 15a may be provided on one plate surface of the cathode active material layer 15b (see FIG. 6A), or on each of the plate surfaces of the cathode active material layer 15b (see FIG. 6B).

As shown in FIG. 6B, when the cathode collector 15a is provided on both of the plate surfaces of the cathode active material layer 15b, one cathode collector 15a1 may have a thickness greater than that of the other cathode collector 15a2 so as to sustain the self-standing cathode active material layer 15b. In this case, the counter cathode collector 15a2 is formed so as to have such a structure that intercalation/deintercalation of lithium ions through the self-standing cathode active material layer 15b is not inhibited (e.g., mesh-shape or porous). Notably, the cathode collector 15a2 may be applied to the cathode 15 shown in FIG. 1B.

As shown in FIG. 6A, when the cathode collector 15a is provided on one plate surface of the cathode active material layer 15b, the direction of transfer of lithium ions is reverse to that of electrons in the cell reaction at the cathode 15 during charging/discharging, whereby the electric potential slope is generated in the cathode active material layer 15b. As the electric potential slope increases, diffusion of lithium ions are inhibited.

In contrast, as shown in FIG. 6B, through provision of the cathode collector 15a2, which does not inhibit intercalation/deintercalation of lithium ions, on the surface of the self-standing cathode active material layer 15b in contact with the electrolyte layer 13, the aforementioned generation of the electric potential slope is prevented. Thus, cell performance is enhanced.

No particular limitation is imposed on the plate-like particles for cathode active material and the cathode active material film of the present invention, and any materials other than those disclosed in the aforementioned Specific Examples may be employed, so long as they have a layered rock salt structure. For example, when the plate-like particles for cathode active material and the cathode active material film are each formed from a solid solution containing at least two of cobalt, nickel, and manganese, the same effects as shown in the Specific Examples can be attained even when they have a composition not disclosed in the Specific Examples. Specific examples of the solid solution which may be employed in the invention include lithium nickelate, lithium manganate, lithium nickelate manganate, lithium nickelate cobaltate, lithium cobaltate nickelate manganate, and lithium cobaltate manganate. These materials may contain one or more elements of Mg, Al, Si, Ca, Ti, V, Cr, Fe, Cu, Zn, Ga, Ge, Sr, Y, Zr, Nb, Mo, Ag, Sn, Sb, Te, Ba, Bi, etc.

At a temperature of 920° C. or higher, the phase of cobalt oxide is transformed from a spinel structure represented by $Co_3O_4$ at room temperature to a rock salt structure represented by CoO. Meanwhile, Mn and Ni assume a spinel structure represented by $Mn_3O_4$ and a rock salt structure represented by NiO, respectively, over a wide range of temperature.

Thus, as in the case of Co, the phase transformation of a solid solution containing at least two of Co, Ni, and Mn from a spinel structure at low temperature to a rock salt structure can be evoked at high temperature through controlling the composition, temperature, atmosphere, pressure, etc.

In this case, a self-standing sheet formed of a large number of (h00)-oriented plate-like $M_3O_4$ (M includes at least one selected from among Co, Ni, and Mn) particles is formed, and then the sheet or pieces obtained by crushing the sheet are intercalated with lithium, whereby an $LiMO_2$ sheet or plate-like particles for cathode active material in which crystal facets, such as (104) and (101), through which lithium ions are intercalated and deintercalated, are oriented in parallel with the plate surface.

That is, for example, even an Ni—Mn composite oxide, containing no Co, assumes a rock salt structure at high temperature and a spinel structure at low temperature as in the case of a Co oxide. Thus, the Ni—Mn composite oxide may be used to form an oriented sheet in a manner similar to that mentioned above. By introducing lithium into the thus-formed sheet or pieces obtained by crushing the sheet, a favorably oriented cathode active material represented by $Li(Ni,Mn)O_2$ may be produced.

Also, in a cathode active material having an olivine structure such as $LiFePO_4$, the (110) plane serves as a plane through which lithium ions are intercalated and deintercalated. Thus, through forming plate-like particles or a film in which the (110) planes are oriented in parallel with the plate surface, a cathode active material having good performance can be yielded.

Needless to say, those modifications which are not particularly referred to are also encompassed in the technical scope of the present invention, so long as the invention is not modified in essence.

Those components which partially constitute means for solving the problems to be solved by the present invention and are illustrated with respect to operations and functions encompass not only the specific structures disclosed above in the description of the above embodiment and modifications but also any other structures that can implement the operations and functions. Further, the contents (including specifications and drawings) of the prior application and publications cited herein can be incorporated herein as appropriate by reference.

What is claimed is:

1. A method for producing a cathode active material for a lithium secondary battery, the material having a layered rock salt structure, said method comprising:
   forming a sheet body containing, as raw materials, a lithium compound serving as a first ingredient, a compound of a transition metal serving as a second ingredient, and at least one of boron oxide and vanadium oxide serving as a third ingredient; and
   a firing step of firing the sheet body at 700 to 1,300° C. to produce a fired sheet body.

2. The method for producing a cathode active material for a lithium secondary battery according to claim 1, wherein a content of the third ingredient in the sheet body is 0.4 to 25 wt. % with respect to a total weight of the raw materials in the sheet body.

3. The method for producing a cathode active material for a lithium secondary battery according to claim 1, wherein the third ingredient contains both boron oxide and vanadium oxide and has a ratio by mole of boron oxide to vanadium oxide falling within a range of 1 to 10.

4. The method for producing a cathode active material for a lithium secondary battery according to claim 1, further comprising:

crushing the fired sheet body into a large number of plate-like particles.

5. The method for producing a cathode active material for a lithium secondary battery according to claim 1, wherein said sheet body has a thickness that is substantially equal to a thickness of one particle and is in a range of 2 μm to 50 μm.

* * * * *